US011423016B2

(12) United States Patent
Bellur et al.

(10) Patent No.: US 11,423,016 B2
(45) Date of Patent: Aug. 23, 2022

(54) METHOD FOR SCALING COMPUTATION IN BLOCKCHAIN BY DELAYING TRANSACTION EXECUTION

(71) Applicant: Indian Institute of Technology Bombay, Mumbai (IN)

(72) Inventors: Umesh Bellur, Mumbai (IN); Nitin Awathare, Hinganghat (IN); Sourav Das, Dhekiajuli (IN); Vinay Joseph Ribeiro, Delhi (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 153 days.

(21) Appl. No.: 16/912,389

(22) Filed: Jun. 25, 2020

(65) Prior Publication Data
US 2020/0409941 A1    Dec. 31, 2020

(30) Foreign Application Priority Data

Jun. 26, 2019  (IN) .............................. 201921025326

(51) Int. Cl.
*G06F 16/23*  (2019.01)
*G06F 16/27*  (2019.01)
(Continued)

(52) U.S. Cl.
CPC .......... *G06F 16/2379* (2019.01); *G06F 16/27* (2019.01); *H04L 9/0637* (2013.01);
(Continued)

(58) Field of Classification Search
None
See application file for complete search history.

(56) References Cited

U.S. PATENT DOCUMENTS 10,608,825 B2 * 3/2020 Berg ................. G06Q 20/3825
2017/0337534 A1 * 11/2017 Goeringer ............ G06Q 20/123
(Continued)

OTHER PUBLICATIONS

K. Saito and H. Yamada, "What's So Different about Blockchain?—Blockchain is a Probabilistic State Machine," 2016 IEEE 36th International Conference on Distributed Computing Systems Workshops (ICDCSW), 2016, pp. 168-175, doi: 10.1109/ICDCSW.2016.28. (Year: 2016).*

(Continued)

*Primary Examiner* — Alford W Kindred
*Assistant Examiner* — Cao D Vuong

(57) ABSTRACT

Accordingly, embodiment herein disclose a method for handling block chain operation in a block chain system. The method includes parallelizing, by the block chain system, a block creation along with a consensus mechanism. The block creation along with the consensus mechanism includes parallelly combining a pre-computed state of a succeeding block (at height "k" greater than the current block, where "k" is a positive integer parameter chosen by the system designer) with transactions in a current block to obtain state to be stored in a next succeeding block (at height "k+1" greater than the current block) along with running a consensus protocol to finalize transactions to include in an immediate next block (at height one greater than the current block). Further, the method includes handling, by the block chain system, the block chain operation based on parallelizing. The method can be used for scaling up computation in blockchains.

18 Claims, 13 Drawing Sheets

(51) Int. Cl.
    *H04L 9/06*         (2006.01)
    *H04L 9/40*         (2022.01)
    *H04L 9/00*         (2022.01)

(52) U.S. Cl.
    CPC ............... *H04L 63/12* (2013.01); *H04L 9/50* (2022.05); *H04L 2209/56* (2013.01)

(56) References Cited

U.S. PATENT DOCUMENTS

| | | | |
|---|---|---|---|
| 2019/0012249 A1* | 1/2019 | Mercuri | G06Q 20/405 |
| 2019/0042989 A1* | 2/2019 | Scott | H04L 9/3239 |
| 2019/0074962 A1* | 3/2019 | Ateniese | H04L 63/061 |
| 2019/0158470 A1* | 5/2019 | Wright | H04L 63/0442 |
| 2019/0279197 A1* | 9/2019 | Wright | H04L 9/0637 |
| 2019/0286629 A1* | 9/2019 | Song | H04L 9/3239 |
| 2020/0074438 A1* | 3/2020 | Boemi | G06Q 20/201 |
| 2020/0394159 A1* | 12/2020 | Hurley | H04L 63/123 |

OTHER PUBLICATIONS

R. Agrawal et al., "Continuous Security in IoT Using Blockchain," 2018 IEEE International Conference on Acoustics, Speech and Signal Processing (ICASSP), 2018, pp. 6423-6427, doi: 10.1109/ICASSP.2018.8462513. (Year: 2018).*

* cited by examiner

METHOD FOR SCALING COMPUTATION IN BLOCKCHAIN BY DELAYING TRANSACTION EXECUTION

FIELD OF INVENTION

The present disclosure relates to blockchains, and more specifically related to a method for scaling computation in blockchain by delaying transaction execution. The present application is based on, and claims priority from an Indian Application Number 201921025326 filed on 26 Jun. 2019 the disclosure of which is hereby incorporated by reference herein.

BACKGROUND

A blockchain system is a system consisting of several nodes (servers) in which all node maintains a replica of a data structure called a blockchain. The set of data contained in the replica at each node at particular instance represents the state. The state is more commonly represented by a set of key-value pair, that can be modified using transactions. The node collects the locally available transactions, in a structure called mempool, executes and bundle them into a structure called a block. A block consists of a pointer to a previous block and an ordered list of transactions on which nodes (servers) in the network work out a consensus protocol. The consensus protocol is a protocol used by all servers maintaining a replica to decide what the next block will contain. The consensus protocol varies from platform to platform based on the type (permissioned and permissionless) and a feature they offers. Most popular consensus protocol in the permissionless setting are proof-of-work (PoW), proof-of-stake (PoS) while in permissioned setting Practical Byzantine Fault Tolerance Algorithm (PBFT), RAFT are ubiquitous.

Newer blockchains further allow execution of immutable program logic called smart contracts. The smart contracts may contain program logic for secure multi-party computation like fair exchange of goods, holding public auction, or any arbitrary Turing Complete program. The smart contracts are created using transactions that contain their program logic. The smart contract creates a set of key-value pairs which can only be accessed and modified by executing the code mentioned in the contract. The set of key-value pairs created by the contract is referred to as the state of the contract. Each contract in the blockchain is identified using a unique key known as address of the contract. The contracts are also referred to as accounts and the corresponding addresses are referred as account addresses. We refer to the contracts that do not have any code are called as Token/User accounts and contracts with code is simply called as Contract account. The address of a token account is the public key of public-private key pair derived from a secure Asymmetric signature scheme. The address of a contract account is derived using the code of the contract and the address of its creator. Also, unlike contract account, user accounts maintains a single key-value pair where "balance" is the key and its value that represents the amount of token currently owned by the account. Thus account balances of all token accounts and contents of key-value pairs in the state of all contract accounts combined together represent the state of the system.

At any point in time suppose the system has i blocks where we denote the $i^{th}$ block using $B_i$. Let $C_j = \{c_j | j=1, 2, \ldots, m\}$ be the set of all contracts created from the $1^{st}$ block to the block $B_i$ with their current state i.e., the state after executing all transactions that appeared in all blocks up to $B_i$, as $S_i = \{\sigma_j | j=1, 2, \ldots, m\}$ where $\sigma_j$ is the set of key-value pair associated with the contract $c_j$.

Each node locally maintains the latest state $S_i$ and on arrival of the block, they update the state by executing all the transactions that appear in the arrived block. Each transaction when executed on a state S results in an updated state which contains the updated set of key-value pairs that gets affected as a result of execution of the transaction on S. Recall, on arrival of a block $B_{i+1}$, all the transactions $T_{i+1}$, that appear in the block gets executed. Further these transactions are executed serially in the order of their positioning in the received block. We refer to this as execution of a block. Equation (1) shows this state transition.

$$S_{i+1} \leftarrow (S_i, T_{i+1}) \qquad (1)$$

Block processing in blockchain: All or a subset of nodes engage in block creation and on successful block creation, the creator(s) broadcast the block to the entire network of nodes. In general, this process is referred to as block mining. Based on the idiosyncrasies of individual consensus mechanisms, the time taken for mining the block can vary. For example, in PoW and PoS consensus algorithm, each individual node locally tries to solve a required Hash puzzle to become the leader that creates the next block. Also, once a node successfully solves the puzzle other nodes in the network can verify the solution in O(1) (constant) time. Additionally, as the leader may include transactions in the block it creates, other miners have to validate that all included transactions are valid as per the requirement of the protocol. This includes re-executing all transactions contained in the block hence the time taken to validate these transactions depends upon the number and complexity of transactions included. On successful validation the nodes apart from the creator simply accepts the block and moves to mining for the next block.

Contrary to the above mentioned approaches, in mechanisms like PBFT and RAFT, the node can create a potential block, without mining, just by executing the transactions it wants to include in the block. However, once the block is created the node must run the consensus procedure to ensure that all honest nodes agree on the same block.

A new protocol Algorand considers an approach where the miners need to run consensus procedure both prior to creation of the block (Reduction step in BA* protocol of Algorand) and also once the block is created (BBA* in BA* protocol of Algorand). Based on this observation, the mechanism of block creation as the process that involves multiple time interval where nodes engage to proceed towards successfully mining the block. We refer to these times as Pre-Creation (PCt), Creation (Ct), Mining (Mt), Validation (Vt) and Post-Validation (PVt) time. The FIG. 1 pictorially depicts these time intervals.

Each time interval has its own significance and sometime depending upon the underlying consensus procedure a few of these time intervals could be absent as well. For example, in PoW after validating the previous block each node can immediately start creating the next potential block, thus PCt is 0 for PoW. Similarly, also nodes other than the creator can simply accept the block after its validation hence PVt is empty as well. Time Mt in PoW is the interval where miners attempt to find a solution for the PoW hash puzzle. Same timing values are also applicable to general PoS consensus procedure. In Algorand however all-time intervals are non-zero because, before a block can be created, nodes need to perform Cryptographic sortition for all of its sub-user. Also, after validation nodes need to participate in Binary BA* protocol. Table 1 further provides information regarding these time intervals for major consensus algorithm that are currently in use for various blockchain systems.

TABLE 1

Correlation of delay component and consensus algorithm

| Algorithm | Used in | Pre-creation | Creation | Mining | Validation | Post-validation |
|---|---|---|---|---|---|---|
| PoW | Bitcoin Ethereum | X | ✓ | ✓ | ✓ | X |
| BA* | Algorand | ✓ | ✓ | ✓ | ✓ | ✓ |
| PoS | Peercoin | X | ✓ | ✓ | ✓ | X |
| PBFT | Zilliqa | X | ✓ | X | ✓ | ✓ |
| RAFT | Quorum | X | ✓ | X | ✓ | ✓ |

Observe that, in all of the above mentioned consensus algorithms all nodes except the creator of the block has to verify a received block. During validation, nodes first verify the block header by checking whether the block has met conditions specified by verifying individual transactions contained in the block. Verification of transactions generally include checking whether the transactions are well formed and carry correct signatures or not. In Bitcoin the nodes also have to check whether the transactions only use previously unspent transaction outputs or not. Systems like Ethereum take a step further where the creator of the block has to include information related to effects of the transactions, which is represented by a Patricia Merkle tree, and the nodes receiving the block must check its validity by re-executing each and every transaction in the block.

As block contains the hash to the previous block, called as parent block, nodes cannot produce new blocks until the previous block is validated and hence accepted. This serialization in the process of verification presents a significant bottleneck in the performance of blockchain. Specifically, a longer validation phase delays the start of the next consensus phase. Also, a large validation time delays the block propagation to the network, since in many blockchain systems such as Bitcoin, each node must forward a block only after it has been validated. Hence to keep the validation phase small, nodes avoid putting computationally intensive transactions (CITs), that is those which require significant computation to validate, inside the block.

In case a block includes CITs, this can lead to a "Verifier's Dilemma". Consider a system using PoW consensus as an example. A miner will be tempted to skip validating the CITs to increase its probability of creating the next block but on the risk of extending an invalid block. If in case, the node skipping validation extends an invalid block, other nodes who validates each received block, will detect the invalid block and discard the blocks that extends the invalid block. On the other hand, validating the block by executing each transaction, delays the consensus mechanism which in PoW like systems directly affects the reward gained by the miners.

Additionally as creation phase also delays the start of the consensus, nodes have an incentive to produce an empty block (block containing no transaction). An empty block may contain a coinbase transaction, that is a reward to miner for solving a cryptographic puzzle, in cryptocurrency based blockchains. In case of cryptocurrency based blockchains, users have to pay higher transaction fees to incentivize the nodes to include a transaction, which in turn affects the fairness.

As the node creating the block does not have to verify it, we separately focus on the scenario where a node creates the next block and the one where it receives a block from the network. We refer to the former as Case I and the later as Case II. The sequence of events that happens at a node, say $N_a$, during the above mentioned cases with PoW as the underlying consensus mechanism are depicted in the FIG. 2. To start with, we will define block height, height(i), as the number of blocks created after the genesis block in the blockchain till, and including, the block $B_i$. In case I, $N_a$ starts by trying to create the block at height i+1 by encapsulating the selected transactions available in mempool ($M_a$), commonly known as the transaction pool. Considering the set of selected transaction includes {$tx_1$, $tx_2$, and $tx_3$}, on successful mining of the block the node can directly move to block creation for the next block with transactions {$tx_4$ and $tx_5$}. However in Case II, a different node say $N_b$ solves the puzzle before $N_a$ and immediately broadcast it. Since nodes can pick the transactions to include in a block independently, the transactions included by $N_b$ in block at height (i+1) denoted by $T'_{i+1}$ can vary from the transactions denoted using $T_{i+1}$, which $N_a$ intended to include in its own block. And in case they differ, i.e., $T'_{i+1}$ is not equal to $T_{i+1}$, the state changes computed by $N_a$ will be of no use for validation of the block created by $N_b$; hence $N_a$ will re-execute all the transactions from the set $T'_{i+1}$. This is depicted in Case II of the FIG. 2.

In the above description, notice that the node $N_a$ receiving a new block from the network had to execute all transactions, since $T'_{i+1}$ is not equal $T_{i+1}$. If in case, $T_{i+1}=T'_{i+1}$, a node could simply skip the validation phase and only check whether the final states ($S_{i+1}$ and $S'_{i+1}$) are equal. If the received final state was indeed identical to the locally computed set, the node could directly jump to the block creation phase thereby eliminating the validation time. This motivated us to design a protocol which can answer the following questions:
1. Can we design a mechanism where, there is a common agreement between nodes regarding which transactions to execute when the next block arrives, prior to the regular consensus mechanism?
2. Assuming such a mechanism exists, who gets to choose which set of transactions gets executed when the next block arrives?
3. Is it possible to answer the above two questions in an efficient manner without compromising the security of the system or making any additional assumptions and maintaining the system fairness guarantees?

In a quest to address questions mentioned above, we have designed two protocols named as (Elimination of Validation Time) EVT and (Elimination of Verifier's Dilemma) EVD (k) for k>1. At a very high level, our idea is to delay execution of transactions by at most (k−1) future blocks. In other words, in EVD(k), transactions that gets included in the block at height (i−k) but must be executed by every miner before the creation phase of the $i^{th}$ block, unlike existing blockchains which require execution of transactions of a block during its own creation and validation phases. Also, the state update corresponding to transactions of block at height (i−k) needs to be reported in the block at height i. EVT is the special case where transaction execution is delayed by only one block.

OBJECT OF INVENTION

The principal object of the embodiments herein is to provide a method for handling block chain operation in a block chain system.

Another object of the embodiments herein is to provide a method for scaling up computation in block chain system.

SUMMARY

Accordingly, the invention provides a method for handling block chain operation in a block chain system. The state stored in the block at height "i" is calculated by executing all transactions in the blockchain serially from the genesis block till the block at height (i−k), where k>0 is an integer parameter selected by a system designer. The method includes executing transactions in a block at height (i−k), not during its creation or validation phases as in existing blockchain, but in parallel to the consensus of succeeding blocks at height (i−k+j), where j=1, 2, . . . , k−1. In this way, the method can be used to pre-compute the state stored in block at height "i" before the creation phase of block at height (i). This pre-computation greatly reduces the time taken by the creation and validation phases of block at height (i). In contrast, in existing blockchains, the state stored in block at height (i) is obtained by serially executing transactions from the genesis block till those transactions contained in block (i) itself; thus transactions stored in block at height (i) are executed during its creation and validation phases and so increase their duration.

In an embodiment, parallelizing, by the block chain system, the block creation along with the consensus mechanism includes acquiring a current block, determining that a state of the current block is similar to a state of at least one locally pre-computed block at the same height as the current block, terminating a validation phase of the current block based on the determination, and activating a block creation phase of the next succeeding block (at height one greater than the current block) to create a new block after terminating the validation phase of the current block. The locally pre-computed state of the next block is pre-created by a miner.

In an embodiment, activating, by the block chain system, the block creation phase of the next succeeding block to create the new block comprises committing current state of the current block, selecting an ordered set of transactions for the immediate next block and conducting a preliminary check for transaction order of the current block, and creating the new block based on the preliminary check and one pre-computed state of the succeeding block with transactions in the current block, and in parallel obtaining the state of the $k^{th}$ succeeding block (where k is a positive integer, fixed by a designer of the block chain system) by executing the transaction order of the current block. Consider, k=1, that is using transactions in block "j" to compute the state in block "j+1". In general, "k" can be much larger than 1. Using transactions in block "j", the electronic device computes the state in block "j+k" for k>1.

In an embodiment, parallelizing, by the block chain system, the block creation along with the consensus mechanism comprise receiving a current block, obtaining a proof-of-work (POW) nonce for the current block, obtaining a state of at least one block at height "k" greater than the current block by executing a transaction order of the current block based on detected POW nonce for the current block, conducting a preliminary check for the chosen transactions of the immediate next block (i.e. height one greater than the current block) based on the rules of the blockchain (such as that the formatting of transactions is correct, they are signed correctly etc.), and creating the new block based on the preliminary check, the selected transactions, and a pre-computed state of the succeeding block (at a height 1 greater than the current block).

In an embodiment, the block creation along with the consensus mechanism is parallelized by computing a state required for validation of at least one next block in parallel to mining of a current block.

In an embodiment, the block creation along with the consensus mechanism is parallelized by utilizing mining time or post-validation time of a current block to compute a state required for validation of at least one next block. The mining time is used in PoW and PoS whereas the post-validation" time is used in PBFT, RAFT, Algorand etc.

In an embodiment, the block chain system performs a preliminary check and an execution check, wherein the preliminary check is performed while including a transaction in a current block where a node checks that the transaction is formed and is eligible to appear in the block chain system, wherein the preliminary check checks that the transaction is correctly signed by a creator and determine if the transaction has already been included earlier in the block chain system, wherein the execution check checks whether a state update mentioned by a block creator is indeed a correct state.

In an embodiment, the block creation along with the consensus mechanism is parallelized by parallelly executing transaction contained in a current block to save on creation time of at least one next block, computing a state required for validation of the at least one next block during a mining time or post-validation time of the current block, and parallelizing the block creation along with the consensus mechanism.

In an embodiment, executing contract transactions in a block at height (i−k), where k>0 is an integer parameter, in parallel to consensus of its "k−1" succeeding blocks in the blockchain (that is blocks at height i−k+j; for j=1, 2, . . . , k−1). The state of the block at height "i" is obtained by executing all contract transactions and refund transactions in the blockchain serially from the genesis block till the block at height (i−k), and all fee transactions till block at height "i". The contract transactions use a different token to that of the fee and refund transactions.

Accordingly, the invention provides a block chain system for handling block chain operation. The block chain system includes a memory and a processor coupled with the memory. A block chain engine is coupled with the processor. The block chain engine is configured to parallelly combine the pre-computed state of the succeeding block at a height more than the current block with transactions in the current block to obtain the state to be stored in the succeeding block at next height more than a block associated with the pre-computed state along with executing the consensus mechanism to finalize transactions to include in the immediate next block at the height one more than the current block. The block chain engine is configured to handle the block chain operation in response to parallelly combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block.

In an embodiment, the height of the succeeding block refers to a number of blocks after a genesis block including the succeeding block in consideration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
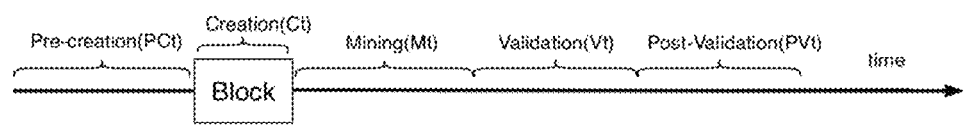
FIG. 1 is a timing diagram illustrating a time split up in a life cycle of block processing when received at the node, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly, the invention provides a method for handling block chain operation in a block chain system. The method includes parallelly combining the pre-computed state of the succeeding block at a height more than the current block with transactions in the current block to obtain the state to be stored in the succeeding block at next height more than the current block along with executing a consensus mechanism to finalize transactions to include in the immediate next block at the height one more than the current block. The block chain engine is configured to handle the block chain operation in response to parallelly combining the pre-computed state of the succeeding block at a height more than the current block with transactions in the current block to obtain the state to be stored in the succeeding block at next height more than the current block along with executing a consensus mechanism to finalize transactions to include in the immediate next block at the height one more than the current block.

Unlike conventional systems and methods, in the proposed methods, the validation of a block can now be done in parallel to consensus. Hence the computation time available goes up by several orders of magnitude. In many existing methods, the blocks are normally first validated before forwarding which introduces delays in the forwarding. As longer validation phase introduces longer delay, in existing systems a fixed upper bound is enforced. Note, that this threshold also considers contract execution time. Now with EVT and EVD(k) as we only need to perform preliminary checks on the newer transactions, this threshold can be reduced without affecting the throughput (number of transactions per second). Therefore, EVT and EVD(k) will lead to faster block propagation. Several transactions which require low amounts of computation can now be batched into a single larger contract transaction that pays a single fee transaction. Thus the number of transactions can increase by orders of magnitude without affecting the validation required before propagation. Done in a naive way, this may increase the size of the block as more data will be required to represent such transactions. Several optimization are possible to reduce the transaction data.

Referring now to the drawings, and more particularly to FIGS. 3 through 12, where similar reference characters denote corresponding features consistently throughout the figures, there are shown preferred embodiments.

Preliminaries and Notation: Blockchain contains accounts. Each account is identified using a unique public key given to it. Each account may control a program logic called smart contract which defines the functionalities the account can perform. Transfer of cryptocurrencies from token account are controlled using secret keys related to the identity of the account. For contract accounts, the program logic handles interaction of the contract with other contract accounts, token accounts or external entity. Each transaction either invokes a function from a smart contract or transfers a certain amount of cryptocurrency from one account to other.

EVT Design: As discussed earlier the basic idea behind EVT is to delay execution of transactions by one block, i.e., transactions that are first included in a block at height i say $B_i$ without executing them. These transactions then need to be executed before starting consensus for the next block. Also, the creator of the next block $B_{i+1}$ must evaluate the state resulting from transactions from the parent block $B_i$. During this process, unlike in existing blockchain systems, each transaction in EVT goes through two verification checks: Preliminary Checks and Execution checks. Preliminary check is performed while including a transaction in a block where a node must check that the transaction is well formed and is eligible to appear in the block. Specifically Preliminary check may include but is not limited to checking that the transaction is correctly signed by its creator, checking if the transaction has already been included earlier etc.

Execution check of a transaction involves checking whether the state update mentioned by the block creator is indeed a correct state. To achieve this we modify the structure of blocks in the blockchain in the manner shown in FIG. 3. Also, state update in EVT is given by the equation (2), where $S_i$ represents the state at $i^{th}$ block and $T_i$ corresponds to the transactions included in the $i^{th}$ block.

$$S_i \leftarrow (S_{i-1}, T_{i-1}) \qquad (2)$$

Figure 4A:
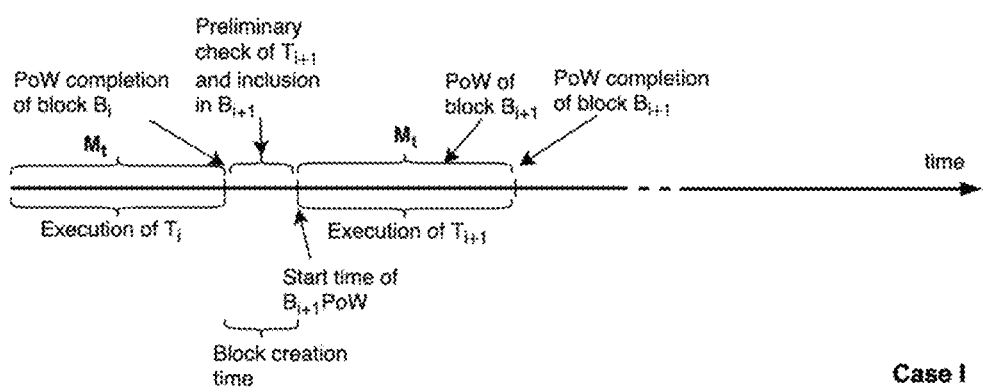
FIG. 4a is a timing diagram illustrating sequence of events that occurs at a miner in EVT on creating a block (Case I) and arrival of a block from the network (Case II) with PoW as the underlying consensus mechanism, according to embodiments as disclosed herein.
Figure 4A:
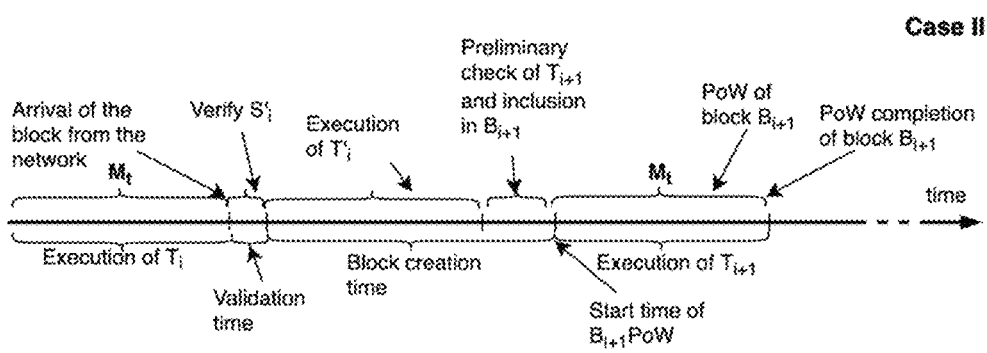

FIG. 4a is a timing diagram illustrating sequence of events that occurs at a miner in EVT on creating a block (Case I) and arrival of a block from the network (Case II) with PoW as the underlying consensus mechanism, according to embodiments as disclosed herein.

Figure 4B:
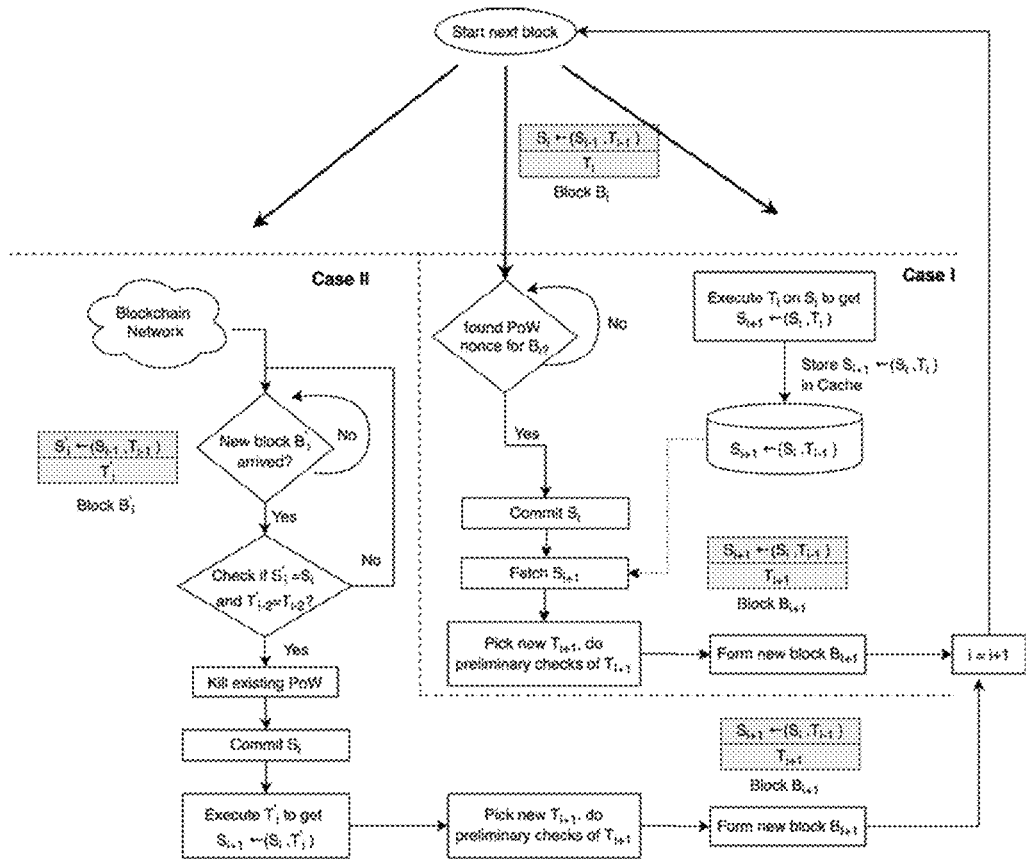
FIG. 4b is a flow chart demonstrating the sequence of events that happen at a miner in EVT on creating a block (Case I) and on the arrival of a block from the network (Case II) with PoW as the underlying consensus mechanism, according to embodiments as disclosed herein.

FIG. 4b is a flow chart demonstrating the sequence of events that happen at a miner in EVT on creating a block (Case I) and on the arrival of a block from the network (Case II) with PoW as the underlying consensus mechanism, according to embodiments as disclosed herein.

Figure 2:
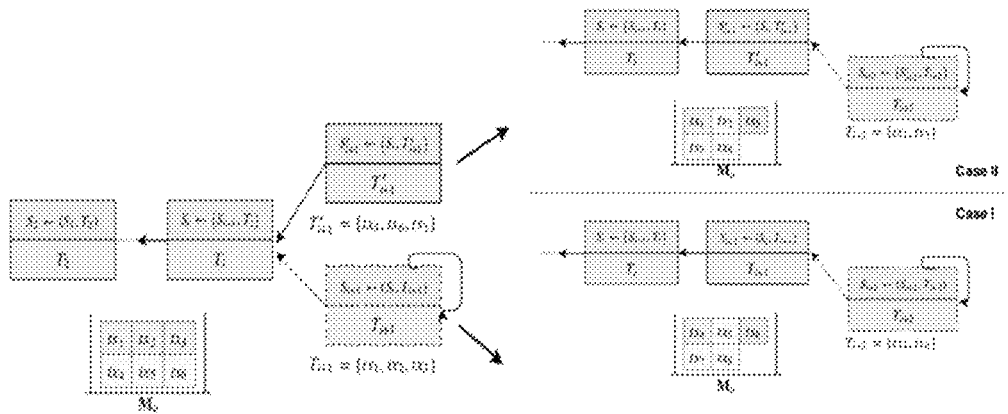
FIG. 2 illustrates a block created event and a block received event, according to a prior art.
Figure 3:
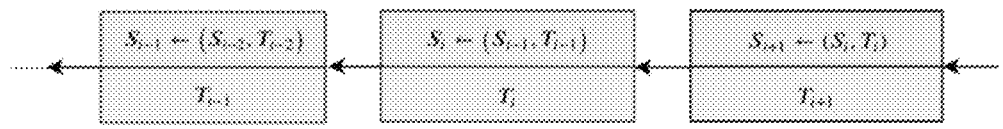
FIG. 3 illustrates a block structure in EVT.

We will now gauge improvements achieved due to EVT by closely comparing EVT to the existing blockchain platforms as by considering the two cases similar to as in FIG. 2.

Case I: Recall in case I, node $N_a$ successfully creates the block before everyone else in the network. Since $N_a$ has created the block itself, it does not have to validate the block and hence it eliminates the validation time. Also, during consensus of the current block, $N_a$ can parallel execute transaction contained in it to save on creation time of the next block. This is depicted in Case I in the FIG. 4b.

Case II: When the node receives the block, $B_i$ with transaction ordered list $T_i'$, from other node, say $N_b$. Since the state mentioned in $B_i$ is only till $T_{i-1}$ and as $N_a$ has already executed $T_{i-1}$ during creation of its local potential block, $N_a$ can validate the received block by directly comparing its local state with the state mentioned in the block. Let the state after executing the transactions from ordered list $T_{i-1}$ starting from state $S_{i-1}$ be $S_i$, then to create the next next-block $B_{i+1}$, $N_a$ needs to execute transactions in the ordered list $T_i'$ on the state $S_i$ as $T_i'$ may differ from $T_i$. This will result in the state $S_{i+1}$ which $N_a$ can include in its local block and proceed to next step of the process. Note that in EVT, the nodes parallelize validation of received blocks with other components of consensus. For example, in PoW and PoS blockchains, a miner can compute the state required for validation of the next block in parallel to mining of the current block. When EVT is used along with PBFT, RAFT and Algorand, miners can utilize post-validation time of the current block to compute the state required for validation of the next block. This allow increase in the transaction execution time of transactions (and hence smart contracts) in each block by a factor of two without affecting the security and fairness of the blockchain system. In order to see why, consider a PoW blockchain in Case II. Without EVT, the transactions in both the received block and in the newly created block must be executed serially to mining. With EVT, only the transactions in the received block are executed serially to mining. Hence for any allowed fixed time gap between consecutive mining times (Mt), with EVT we can have blocks with twice the computation than without EVT. Note that keeping the time gap between mining periods fixed ensures the same level of security and fairness. This is depicted in Case II of the FIG. 4b.

Figure 5:
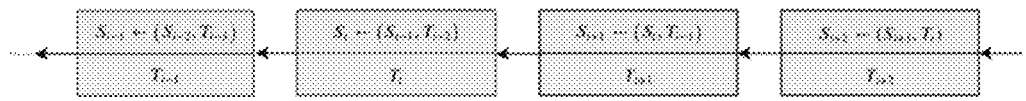
FIG. 5 illustrates a block Structure in EVD(2), according to embodiments as disclosed herein.

EVD(k) Motivation and Design: It is evident that even though we could speed up the process of validation of state in a received block using EVT, it does not let us scale smart contracts beyond a factor of two. This is because to create the state of $i^{th}$ block requires executing transactions included in the $(i-1)^{th}$ block. Thus allowing computationally intensive transactions in blocks will increase the time to create the next block and hence delay the consensus process. The above mentioned concern raises the requirement of a mechanism that also parallelizes the creation of the next block along with the consensus, which is achieved by EVD(k) for k>1. At very high level EVD(k) generalizes the idea to postpone the transaction execution to at most (k-1) blocks in future. We will explain the scenario with k=2. A block at height i+1 contains state after executing transaction ordered-list $T_{i+1}$, i.e., $B_{i+1}$ will contain state update corresponding to $T_{i-1}$. Structure of blocks in EVD(2) is shown in FIG. 5. Two cases of EVT are also applicable here, which are described below.

Case I: Node $N_a$ by itself successfully mines the block $B_i$ before anyone else in the network does it. Then $N_a$ picks an ordered list of transactions $T_{i+1}$ for the next block $B_{i+1}$. Further during the consensus for block at height i+1, the node can compute the state required for creating block $B_{i+2}$ by executing the transaction ordered list $T_i$ starting from state $S_{i+1}$. For example, in PoW and PoS during mining time of current block, miners can parallelly compute state required for validation of the next block. Similarly in PBFT, RAFT and Algorand, miners can compute the state required for validation of the next block during post-validation time of the current block. Case I of FIG. 6a depicts EVD(2) in action for PoW based blockchains.

Case II: This is the case where EVD(k) attempts to surpass the existing consensus mechanisms and EVT. Let the arrived block be $B'_i$ containing transactions $T'_i$. Notice that in this block, the state update is done only by executing transactions till $T_{i-2}$ which is already known to every node in the network. Also, while creating the block at height i, all nodes must have already executed transactions in $T_{i-2}$ once. Hence each node can simply validate the received block by comparing the state mentioned in the block and the state computed during an attempt to create the block. This is depicted in Case II of the FIG. 6. Further, during consensus phase for $i^{th}$ block, as $T_{i-1}$ is already known to every node, nodes will execute transactions in $T_{i-1}$ and these execution result can be directly used in the block at height i+1. Thus on arrival of block $B'_i$, $N_a$ can directly start consensus of the block at height i+1.

Figure 6A:
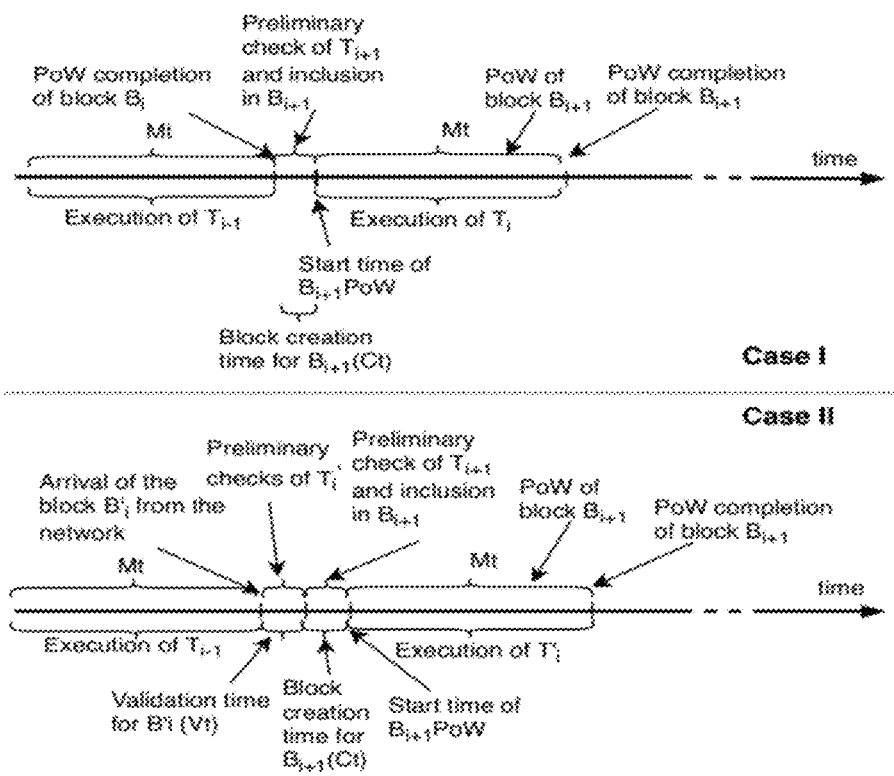
FIG. 6a is a timing diagram illustrating sequence of events that occurs at a miner in EVD(2) on creating a block (Case I) and on the arrival of a block from the network (Case II) with PoW as the underlying consensus mechanism, according to embodiments as disclosed herein.

FIG. 6a illustrates a timing diagram depicting sequence of events that occurs at a miner in EVD(2) on creating a block (Case I) and on the arrival of a block from the network (Case II) with PoW as the underlying consensus mechanism.

Though at very high level EVD(k) postpones the transaction execution to k blocks in the future, designing a secure mechanism is non-trivial considering various security concerns. Security constraints varies from platform to platform and in this document we explain our idea on top of Ethereum blockchain and this idea can be easily extended to class of blockchain systems using consensus procedures described earlier.

Figure 6B:
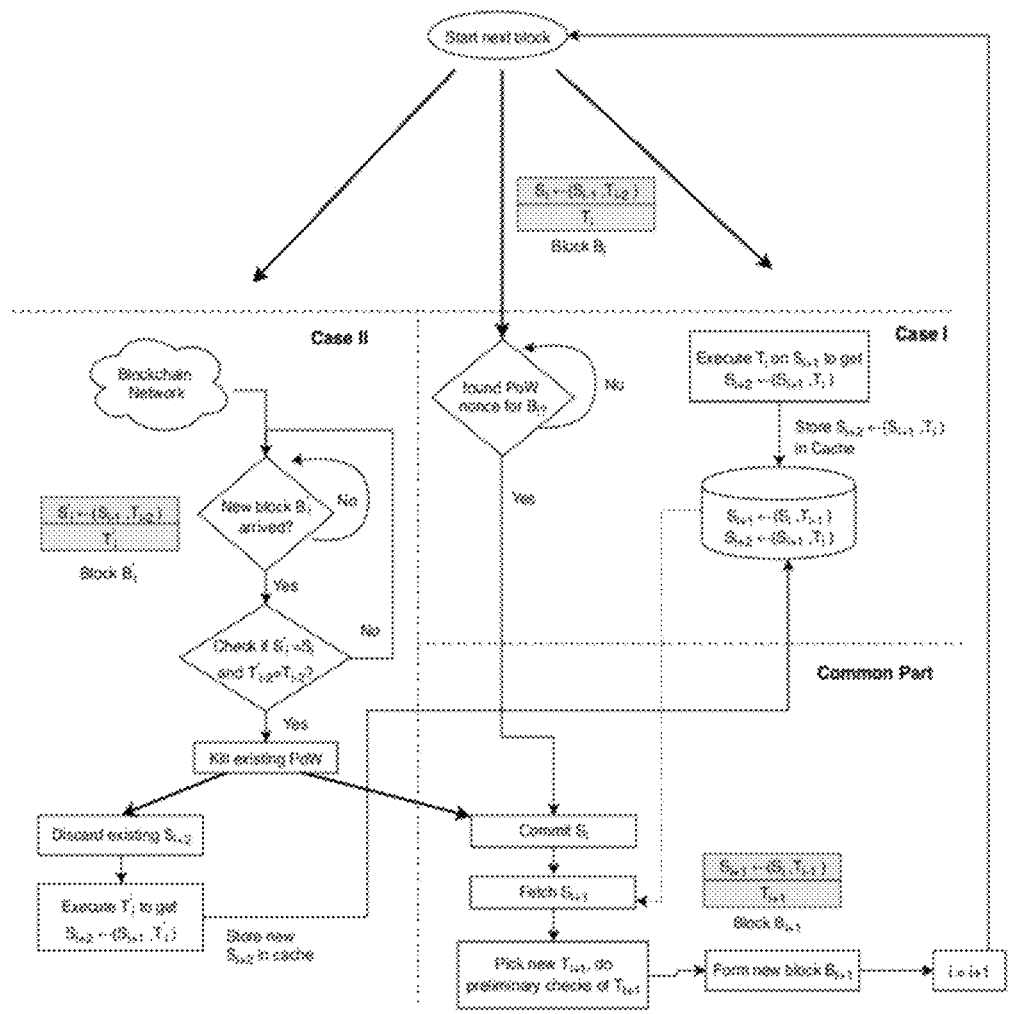
FIG. 6b is a flow chart demonstrating the sequence of events that occurs at a miner in EVD(2) on creating a block (Case I) and on the arrival of a block from the network (Case II) with PoW as the underlying consensus mechanism, according to embodiments as disclosed herein.

FIG. 6b is a flowchart demonstrating the sequence of events that occurs at a miner in EVD(2) on creating a block (Case I) and on the arrival of a block from the network (Case II) with PoW as the underlying consensus mechanism.

Use cases: Consensus mechanism used in Ethereum is PoW and nodes that perform it are designated as Miners. Also, for every transaction that gets included in a block, the miner who creates the block calculates computation used by the transaction. Thus for a given threshold on allowable computation in the block, in Ethereum miners can evaluate the actual amount of computation used in the block during its creation and can include more transactions as long as it does not cross the threshold. However in EVT and EVD(k) as transactions are not executed immediately, miners cannot always compute the amount of computation while including them in the block.

Also, we want to dissuade someone from using up computation time by putting in invalid transactions. Hence we make them pay for computation resources required for transactions immediately, and execute the transactions later. To achieve this we introduce two types of transactions: Payment (Fees and Refund) and Contract. Payment transactions corresponds to transfer of cryptocurrency from a token account to another and contract transactions invoke functionalities provided by smart contracts and hence associated with the contract account. We use payment transaction to pay for computation fees and refund of fees of contract transactions. Hence we "practically" use them for crypto transfer only. In Ethereum blockchain system, only a single type of transaction is considered that can both transfer tokens and invoke smart contracts. From here on we represent ordered list of contract, fees, and refund transactions in the block at height "i" using $T_i$, $F_i$ and $Q_i$ respectively. Note the contract transactions can be computationally intensive, whereas fees and refund transactions require small amounts of computation (for transfer of tokens between token accounts).

For each transaction in $T_i$, we include a transaction in $F_i$ which transfer the fees required for execution of the transaction. These fees are collected when the transaction is included in a block. Specifically, for every contract transaction that a miner includes in a block, the miner collects the fees corresponding to the maximum amount of computation that can be used by the transaction immediately. The maximum may vary from transaction to transaction and is specified by the creator of the transaction. For example, in Ethereum the creator of a transaction needs to specify a parameter Gas Limit (GL) that specifies the maximum possible resource usage. Stating differently, for every contract transaction, we introduce a virtual fee transaction that transfer fees to the creator of the block and this fee transaction gets executed immediately. We include the transaction ordered-list of such virtual fee transactions for a transaction ordered-list $T_i$ into $F_i$ along with the set of payment transactions. Note that virtual fee transaction is associated with the token account. With these added modifications, changes in equation (2) are reflected in equation (3a) and (3b). Note that k=1 for EVT, and k>1 for EVD(k). We introduce a new state $P_i$ to represent state of token accounts, while $S_i$ represents the state of contract accounts stored in block at height "i". We use two different tokens: one for payment transactions and the other for contract transactions to enable the neat separation of overall state into P (state corresponding to payment token) and S (state corresponding to contract token). We consider the scenario without refund transactions now. Refunds are described later.

$$S_i \leftarrow (S_{i-1}, T_{i-k}) \tag{3a}$$

$$P_i \leftarrow (P_{i-1}, F_i) \tag{3b}$$

Similar to above, we next describe the sequence of events that occurs at a miner that results in addition of a block in the blockchain considering two types of transactions.

Figure 7A:
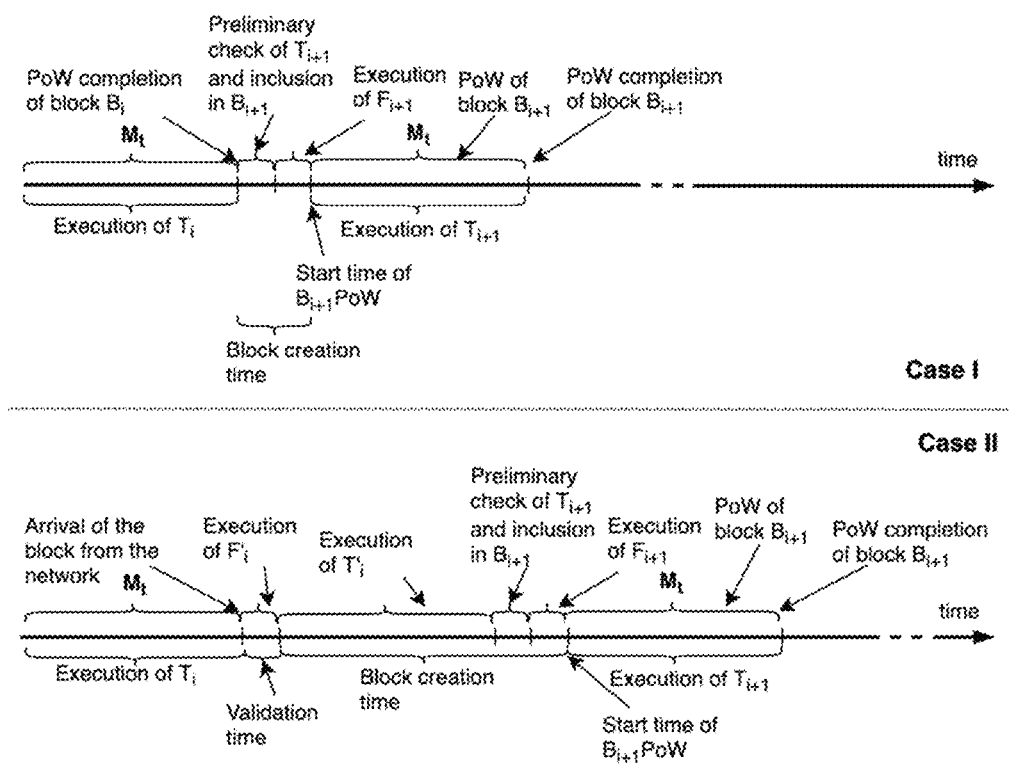
FIG. 7a is a timing diagram illustrating sequence of events that occurs at a miner in EVT along with the introduction of fees transaction on creating a block (Case I) and on the arrival of a block from the network (Case II) with PoW as the underlying consensus mechanism, according to embodiments as disclosed herein.

EVT with Payment Transactions:

Case I: Recall in case I, node $N_a$ successfully creates the block before everyone else in the network. Since $N_a$ has created the block itself, it does not have to validate the block and hence it eliminates the validation time. Also, during consensus of the current block, $N_a$ can parallelly execute transaction contained in it to save on creation time of the next block. For example, in PoW and PoS during mining time of current block, the miners can parallelly compute state required for validation of next block. Similarly in PBFT, RAFT and Algorand, miners can compute state required for validation of next block during post-validation time of current block. Case I of FIG. 7a depicts EVT in action for PoW based blockchains.

Case II: Let us denote the received block with $B'_i$ and let $T'_i$ be the transaction ordered list in the block. As $T_i$ and $T'_i$ can contain different ordered-lists of transaction it is possible that $F_i$ is not equal to $F'_i$. So simply comparing state stored locally (which was computed using $T_{i-1}$ and $F_i$) with the state in the received block will not be sufficient. But notice that, the first part of the state transition from $S_{i-1}$ (that is, $(S_{i-1}, T_{i-k})$ for k=1 in equation (3)) involves common transactions $T_{i-1}$, thus $N_a$ can execute $F'_i$ on the pre-computed $(S_{i-1}, T_k)$ to get the required final state for comparison. Thus, verification on the block arrival boils down to execution of Fees $F'_i$ but $N_a$ still has to execute $T'_i$ before it starts mining on top of block $B'_i$ because the work done by $N_a$ to execute $T_i$ while trying to mine $B_i$ will need to be discarded as $T_i$ and the received $T'_i$ are different. Block verification time is reduced to fee execution time only hence it is independent of complexity of contract transactions encapsulated in the block. As explained earlier, this allows scaling up the computation of transactions in a block by a factor of two, for the same security and fairness. This is depicted in Case II of FIG. 7a. FIG. 7a illustrates a sequence of events that occurs at a miner in EVT along with the introduction of Fees transaction on creating a block (Case I) and on the arrival of a block from the network (Case II) with PoW as the underlying consensus mechanism.

Figure 7B:
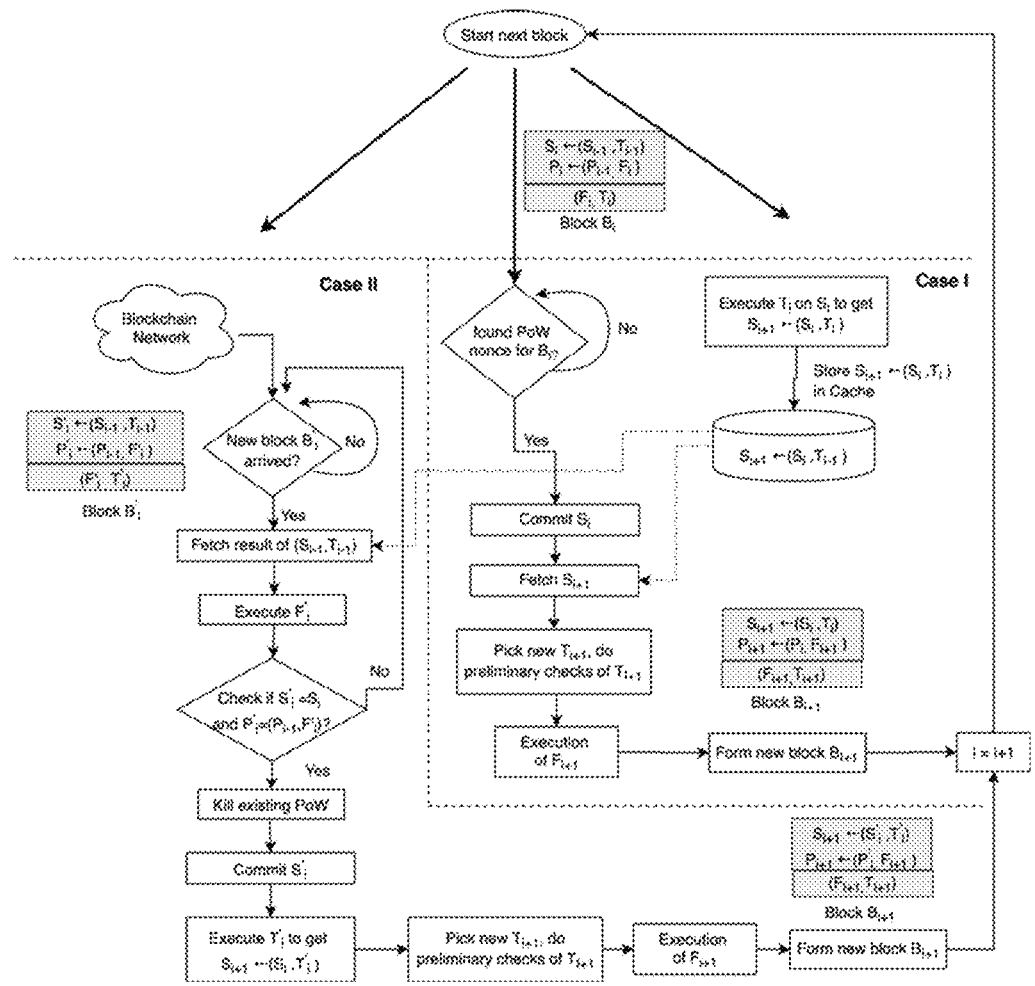
FIG. 7b is a flow chart demonstrating the sequence of events that occurs at a miner in EVT along with the introduction of Fees transaction on creating a block (Case I) and on the arrival of a block from the network (Case II) with PoW as the underlying consensus mechanism, according to embodiments as disclosed herein.

FIG. 7b is a flowchart demonstrating the sequence of events that occurs at the miner in the EVT along with the introduction of Fees transaction on creating a block (Case I) and on the arrival of a block from the network (Case II) with PoW as the underlying consensus mechanism.

EVD(2) with Payment Transactions: Case I: Node $N_a$ by itself successfully creates the block $B_i$ before anyone else in the network. Then $N_a$ picks an ordered list of transactions $T_{i+1}$ for the next block $B_{i+1}$. Further during the consensus for block at height i+1, the node can compute the state required for creating block $B_{i+2}$ by executing the transaction ordered list $T_i$ starting from state $S_{i+1}$. For example, in PoW and PoS during mining time of current block, the miners can parallelly compute the state required for validation of next block. Similarly in PBFT, RAFT and Algorand, miners can compute the state required for validation of the next block during the post-validation time of current block. Case I of FIGS. 8a and 8b depicts EVD(2) in action for PoW based blockchains.

Figure 8A:
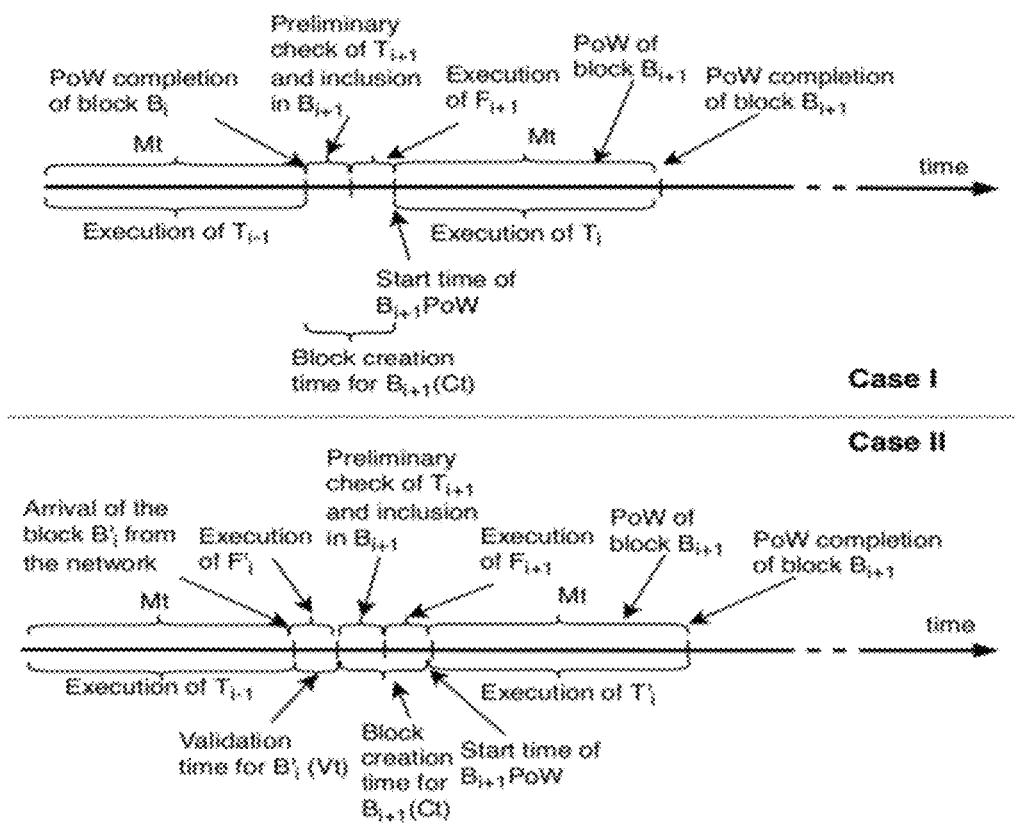
FIG. 8a is a timing diagram illustrating sequence of events that occurs at a miner in EVD(2) along with Fees Transaction on creating a block (Case I) and arrival of a block from the network (Case II) with PoW as the underlying consensus mechanism, according to embodiments as disclosed herein.
Figure 8B:
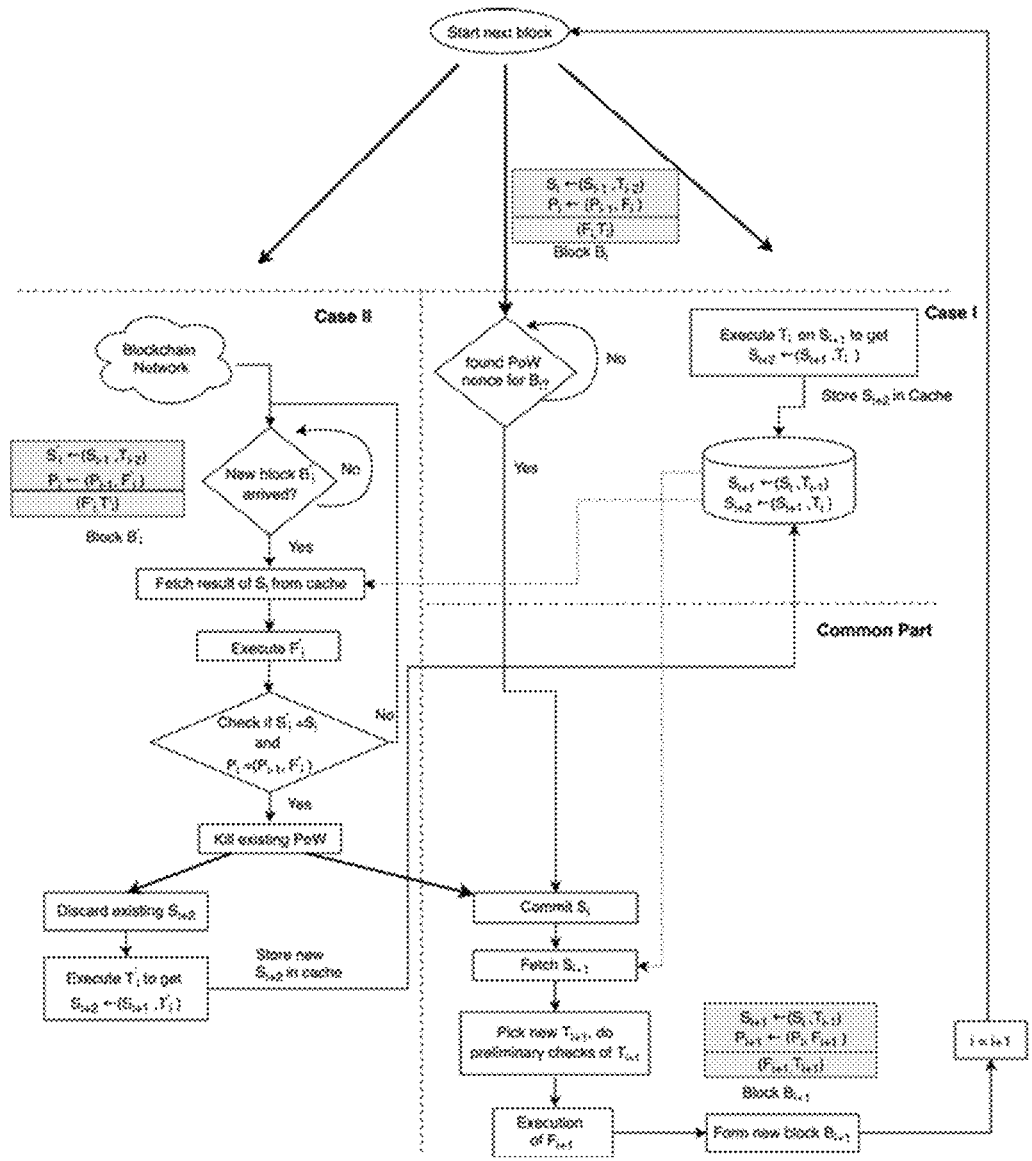
FIG. 8b is a flow chart demonstrating showing sequence of events that occurs at a miner in EVD(2) along with Fees transaction on creating a block (Case I) and on the arrival of a block from the network (Case II) with PoW as the underlying consensus mechanism, according to embodiments as disclosed herein.

FIG. 8a is a sequence of events that occurs at a miner in EVD(2) along with Fees Transaction on creating a block (Case I) and arrival of a block from the network (Case II) with PoW as the underlying consensus mechanism. FIG. 8b is a flowchart showing sequence of events that occurs at a miner in EVD(2) along with Fees Transaction on creating a block (Case I) and on the arrival of a block from the network (Case II) with PoW as the underlying consensus mechanism.

Case II: Let the arrived block be $B'_i$ containing transactions $T'_i$ with final state as $S'_i$ and $P'_i$. Notice that in this block, the first part of the state update is done with $T_{i-2}$ execution (see equation (3a)) and is identical with the first part of the state update at $N_a$ as well. However $T_i$ and $T'_i$ might be different and hence $F_i$ and $F'_i$ will be different Hence the miner recomputes $(P_{i-1}, F'_i)$ and checks if it equals $P'_i$. This computation is fast as fee transactions require little computation in comparison with contract transactions.

Gas Limit: Gas is the internal pricing for running a transaction on smart contract in Ethereum. One important concern is that, since a node does not immediately execute a transaction while including it in a block, it can no longer be certain about the gas used by the transaction in all cases. Nodes are now only aware of the gas limit (maximum gas to be used) specified by the transaction. Hence an overestimation of the tx.gasLimit (gas limit of transaction tx) may throttle down the number of transactions included in the block to 1 in worst case—when tx.gasLimit value is close to maximum block gas limit (mBGL), that is the maximum gas of a block. The primary reason of the over-specification is due to the uncertainty involved during creation of transaction and its actual execution in the contract. Also since in Ethereum, the creator of a transaction completely loses the specified gas in case it gets exhausted before completion of transaction execution, users over-specify the gas limit. This may motivate an adversary to create such transactions where tx.gasLimit is close to mBGL and hence allow him to affect the performance.

Figure 9:
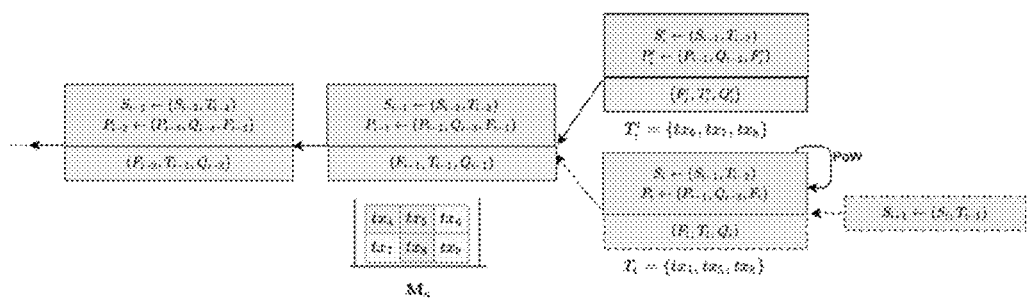
FIG. 9 illustrates a block created event and block received event along with the block structure and state updating with F and Q, according to embodiments as disclosed herein.

FIG. 9 illustrates a block created event and a block received event along with the block structure and state updation with payments F and refunds Q. Every transaction tx in $T_i$ must deposit a fee in $F_i$ whose value equals tx.gasLimit which is an overestimate of the gas required for executing it. After executing T_i, the miner must collect fees from the amount deposited based on the actual computation (gas) used while executing tx, and refund the remaining fees to the creator of tx. The refunds are placed in Q. In order to create a block $B_i$, a miner chooses a set of contract transactions $T_i$ to put in the block. The block contains the states $S_i$ and $P_i$, the contract transactions $T_i$ and its corresponding fees $F_i$ and refunds $Q_i$. The state is updated as $$S_i \leftarrow (S_{i-1}, T_{i-k}) \qquad (4)$$

$$P_i \leftarrow (P_{i-1}, Q_{i-k}, F_i) \qquad (5)$$

In EVD(k), the state $S_i$ is obtained by starting from the state of the parent block $S_{i-1}$ and then updating this state by first executing transactions $T_{i-k}$ (contract transactions of block $B_{i-k}$). State $P_i$ is obtained by starting with $P_{i-1}$ and executing its corresponding refund transactions $Q_{i-k}$ to refund unspent fees, and finally depositing fees for the transactions in the current block by executing $F_i$. The state $S_i$ is computed in parallel to consensus of descendants of $B_{i-k}$ (that is blocks $B_{i-k+j}$ for j=1, 2, . . . k−1), and stored in a cache. This pre-computation of this state $S_i$ of block height "i" helps speed up both its creation and validation phases. The computation of $P_i$ is fast as it only involves computation of refund $Q_{i-k}$ and fees $F_i$. If the consensus protocol designates some other block $B'_i$ of another miner at height "i" (instead of $B_i$), then the miner executes $(P_{i-1}, Q_{i-k}, F'_i)$ (where $F'_i$ are the fee transactions in $B'_i$) and sees if it matches the state $P'_i$ stored in $B'_i$. This last computation is fast, as it only involves computation of refund $Q_{i-k}$ and fees $F'_i$, thus speeding up the validation phase. Note that in FIG. 9, we have set k=2.

Figure 10A:
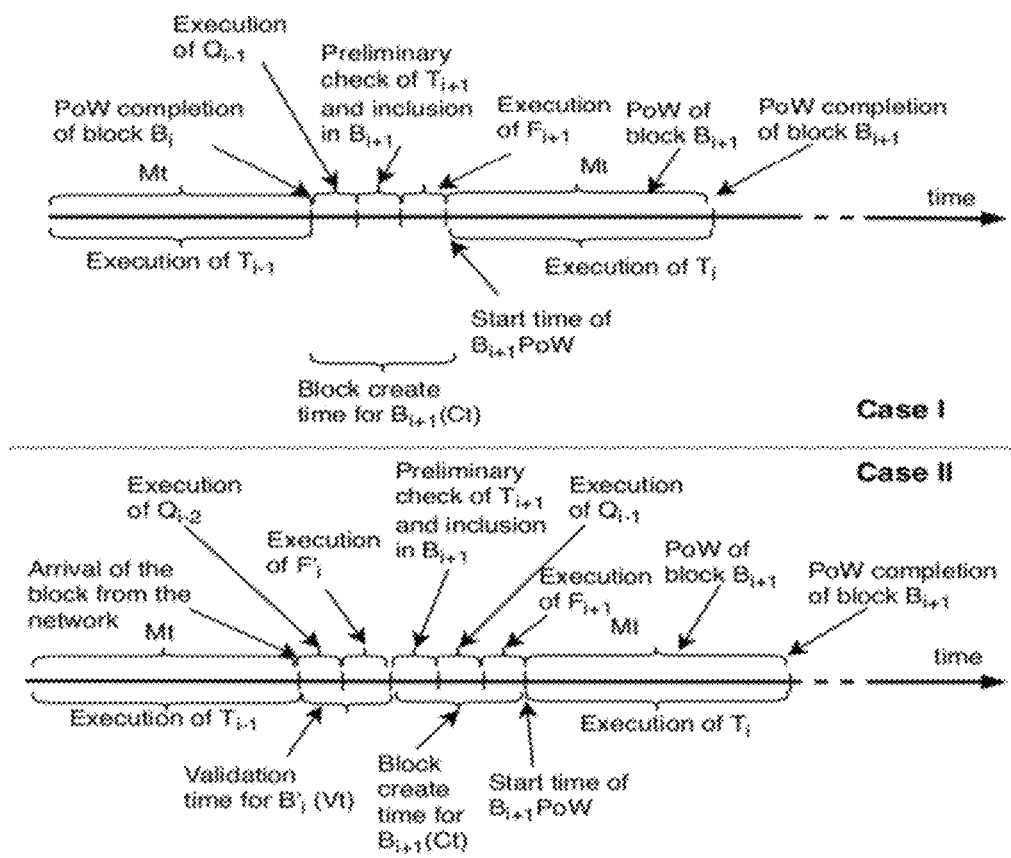
FIG. 10a is a timing diagram illustrating sequence of events that occurs at a miner in EVD(2) along with fees Transaction and refund transaction on creating a block (Case I) and on the arrival of a block from the network (Case II) with PoW as the underlying consensus mechanism, according to embodiments as disclosed herein.

FIG. 10a is a sequence of events that occurs at a miner in EVD(2) along with fees transaction F and refund transaction Q on creating a block (Case I) and on the arrival of a block from the network (Case II) with PoW as the underlying consensus mechanism.

Figure 10B:
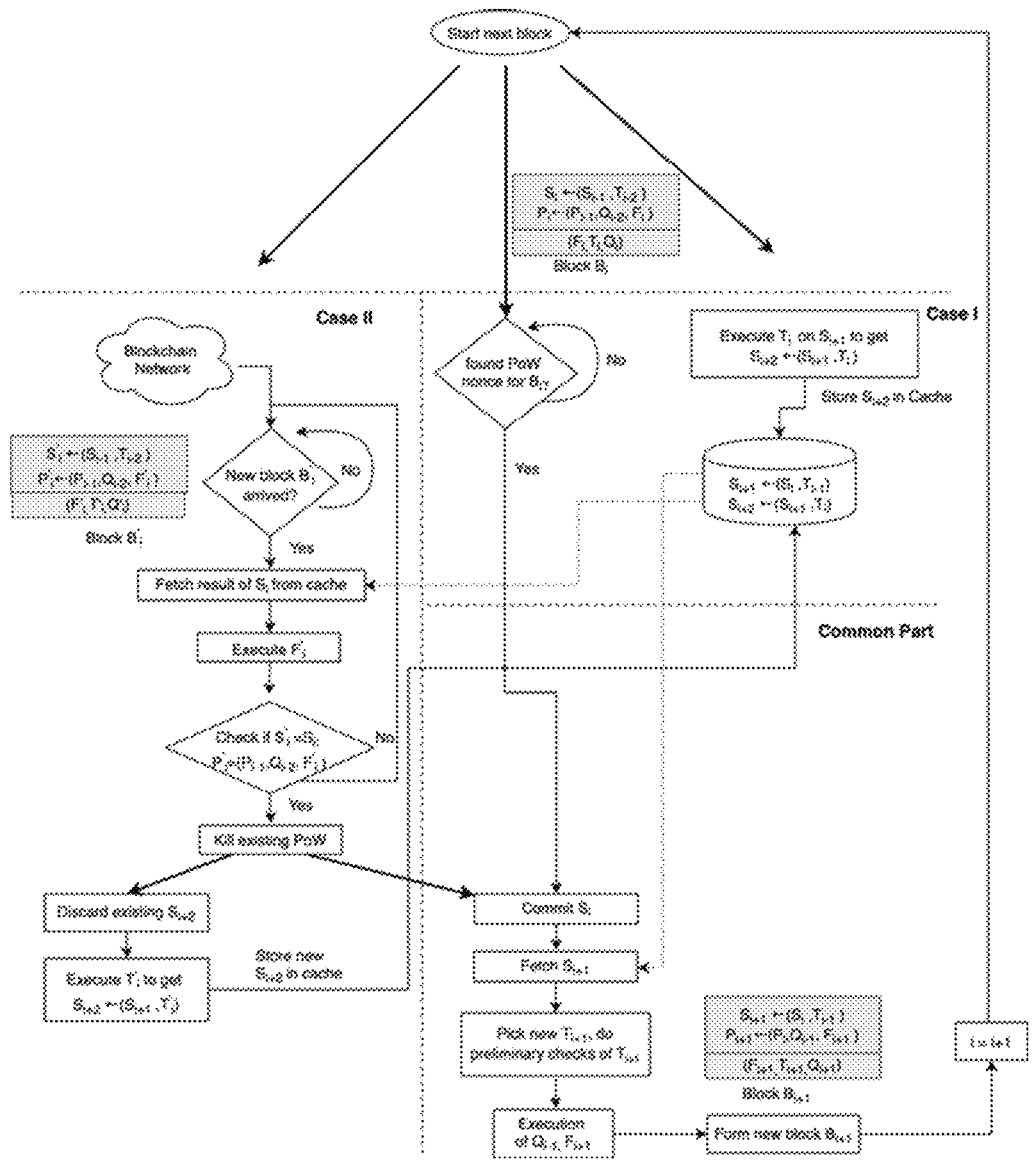
FIG. 10b is a flow chart illustrating a sequence of events that occurs at a miner in EVD(2) along with fees transaction and refund transaction on creating a block (Case I) and on the arrival of a block from the network (Case II) with PoW as the underlying consensus mechanism, according to embodiments as disclosed herein.

FIG. 10b is a flowchart of sequence of events that occurs at a miner in EVD(2) along with Fees Transaction F and refund transaction Q on creating a block (Case I) and on the arrival of a block from the network (Case II) with PoW as the underlying consensus mechanism.

To mitigate the effect due to above mentioned adversarial behavior, an amount tx.gasLimit is collected by the creator of the block independent of the gas used. This amount is deducted from the transaction creators account by the miner who add this transaction to a block, say $B_i$. When the transaction actually gets executed at block $B_{i+2}$, the miner of the block computes the actual amount of gas used by the transaction. If αtx.gasLimit gas is used by the transaction, where α∈[0,1] and tx.gasLimit is the gas limit specified by the transaction tx, then the miner gets paid G(α) xtx.gasLimit and the remaining amount is refunded to the creator of the transaction. The function G can be chosen by the system designer. We treat these refunds as virtual transactions and denote the ordered list of refund transactions corresponding to an ordered list of transaction $T_i$ with $Q_i$. Hence with Fees (F), Contract (T) and Refund (Q), the contents of each block and order of execution of the transaction is mentioned in the FIG. 9,10a and FIG. 10b respectively.

EVD(k): Describe details of how EVD(k) executes contract transactions. In EVD(k) on arrival of a new block, each node adds the transaction ordered list T of the block in a local queue following the block order. We call each transaction ordered list to be processed as a Task and the queue where miner stores unprocessed blocks as the task queue. At any instant in time, the task queue contains unprocessed tasks only corresponding to the longest chain at that instant. In case of block reorganization due to the miner shifting to a new longer chain, miners update the queue appropriately. Also, observe that the last element of the task queue is the transaction ordered list contained in the current head of the chain.

Node executes tasks from this queue in First Come First Serve (FCFS) order and cache their results till the queue is empty. To mine a block say at height j say $B_j$, first a miner fetches the execution result corresponding to block at height j–k which is a direct ancestor of the block. For a block, we refer to such ancestor as the $k^{th}$ parent of a block. A miner then adds an appropriate refund which is followed by the payment transaction corresponding to the block at height j. Thus with a block at height j with transactions ($F_j$, $T_j$, and $Q_j$) its ordering in EVD(k) is given by equations (6a) and (6b).

$$( \ldots, T_{j-k}, T_{j-k+1}, T_{j-k+2}, \ldots ) \quad (6a)$$

$$( \ldots, F_{j-1}, Q_{j-k}, F_j, Q_{j-k+1}, F_{j+1}, \ldots ) \quad (6b)$$

Advantages:
1. MAJOR IMPROVEMENT IN COMPUTATION: Validation of a block can now be done in parallel to consensus. Hence the time available for validating a block, and thereby the total computation of transactions in a block, goes up by several orders of magnitude.
2. COMPUTATIONALLY INTENSIVE TRANSACTIONS: A consequence of point-1 above is that single transactions can now contain heavy computation.
3. FASTER BLOCK FORWARDING: Blocks are normally first validated before forwarding which introduces delays in the forwarding. As longer validation phase introduces longer delay, in existing systems a fixed upper bound is enforced. Note, that this threshold also considers contract execution time. Now with EVT and EVD(k) as we only need to perform preliminary checks on the newer transactions, this threshold can be reduced without affecting the throughput (number of transactions per second). Therefore, EVT and EVD(k) will lead to faster block propagation.
4. MAJOR INCREASE IN NUMBER OF TRANSACTIONS: Several transactions which require low amounts of computation can now be batched into a single larger Contract transaction that pays a single fee transaction. Thus the number of transactions can increase by orders of magnitude without affecting the validation required before propagation. Done in a naive way, this may increase the size of the block as more data will be required to represent such transactions. Several optimization are possible to reduce the transaction data.

Figure 11:
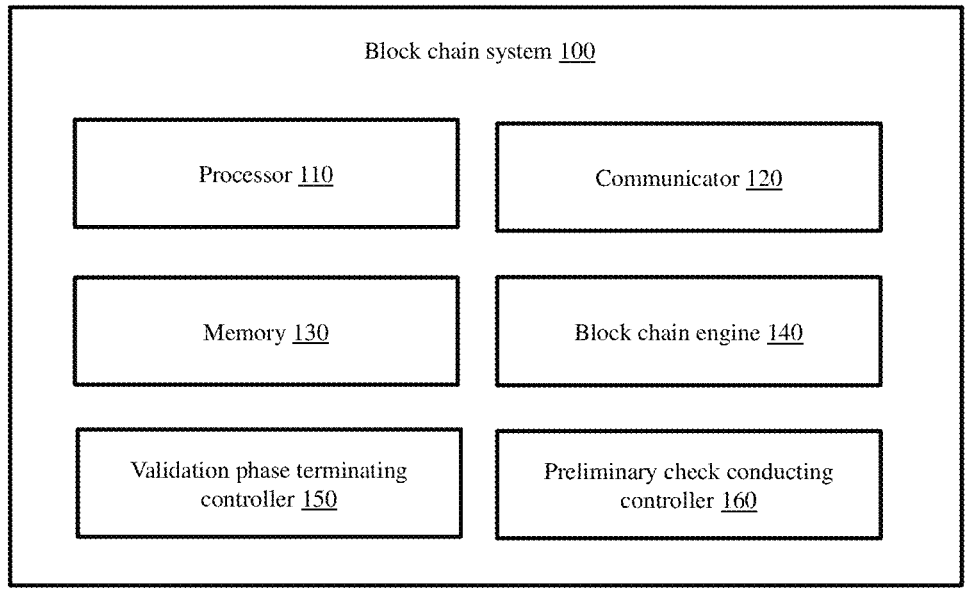
FIG. 11 shows various hardware components of the block chain system for handling block chain operation, according to embodiments as disclosed herein.

FIG. 11 shows various hardware components of the block chain system (100) for handling block chain operation, according to embodiments as disclosed herein. The block chain system (100) includes a processor (110), a communicator (120), a memory (130), and a block chain engine (140), a validation phase terminating controller (150) and a preliminary check conducting controller (160). The processor (110) is coupled with the communicator (120), the memory (130), and the block chain engine (140), the validation phase terminating controller (150) and the preliminary check conducting controller (160).

In an embodiment, the block chain engine (140) is configured to parallelize a block creation along with the consensus mechanism and handle the block chain operation based on parallelizing. The block creation along with the consensus mechanism includes parallelly combining a pre-computed state of a succeeding block (at height (k–1) more than the current block) with transactions in a current block to obtain state to be stored in a succeeding block (at height "k" more than the current block) along with running a consensus protocol to finalize transactions to include in an immediate next block (height one more than the current block).

In an embodiment, parallelizing the block creation along with the consensus mechanism includes acquiring a current block, determining that a state of the current block is similar to a state of at least one locally pre-computed block (at the same height as the current block), discarding/terminating a validation phase of the current block based on the determination using the validation phase terminating controller (150), and activate a block creation phase of the next succeeding block to create a new block after discarding/terminating the validation phase of the current block. The locally pre-computed next block is pre-created by a miner.

In an embodiment, activate the block creation phase of the next succeeding block to create the new block includes commit a current state, select the ordered set of transactions for the immediate next block and conduct the preliminary check for transaction order of the current block using the preliminary check conducting controller (160), and create the new block, and in parallel obtain the state of the k succeeding block (where k=1 for EVT, k>1 for EVD(k)) by executing the transaction order of the current block.

In an embodiment, parallelize the block creation along with the consensus mechanism includes receive a current block, obtained POW nonce for the current block, obtain a state of the $k^{th}$ succeeding block by executing a transaction order of the current block based on the obtained nonce for the current block, conduct a preliminary check for the transaction order of the immediate next block using the preliminary check conducting controller (160), and create the new block based on the conducted preliminary check and the pre-computed state of the succeeding block with transactions in the current block.

In an embodiment, determine that the state of the current block is similar to the state of a locally pre-computed block at the same depth in the chain as the current block includes obtain a suitable final state of the $k^{th}$ succeeding block based on the transaction order of the current block and a state value of the $(k-1)^{th}$ succeeding block (where k is a chosen positive integer).

In an embodiment, the block creation along with the consensus mechanism is parallelized by computing a state required for validation of at least one next block in parallel to mining of a current block.

In an embodiment, the block creation along with the consensus mechanism is parallelized by utilizing mining time or post-validation time of a current block to compute a state required for validation of at least one next block. The mining time is used for PoW and PoS. For PBFT, Algorand etc., the post-validation time is used.

In an embodiment, the block chain system (100) performs a preliminary check and an execution check, wherein the preliminary check is performed while including a transaction in a current block where a node must check that the transaction is formed and is eligible to appear in the block chain system, wherein the preliminary check checks that the transaction is correctly signed by a creator and determine if the transaction has already been included earlier in the current block, wherein the execution check checks whether a state update mentioned by the block creator is indeed a correct state.

In an embodiment, the block creation along with a consensus mechanism is parallelized by parallelly executing transaction contained in a current block to save on creation time of at least one next block, computing a state required for validation of the at least one next block during a mining time or post-validation time of the first block, and parallelizing the block creation along with the consensus mechanism.

The processor (110) is configured to execute instructions stored in the memory (130) and to perform various processes. The communicator (120) is configured for communicating internally between internal hardware components and with external devices via one or more networks.

The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 11 shows various hardware components of the block chain system (100) but it is to be understood that other embodiments are not limited thereon. In other embodiments, the block chain system (100) may include less or more number of components. Further, the labels or names of the components are used only for illustrative purpose and does not limit the scope of the invention. One or more components can be combined together to perform same or substantially similar function to handle the block chain operation.

Figure 12:
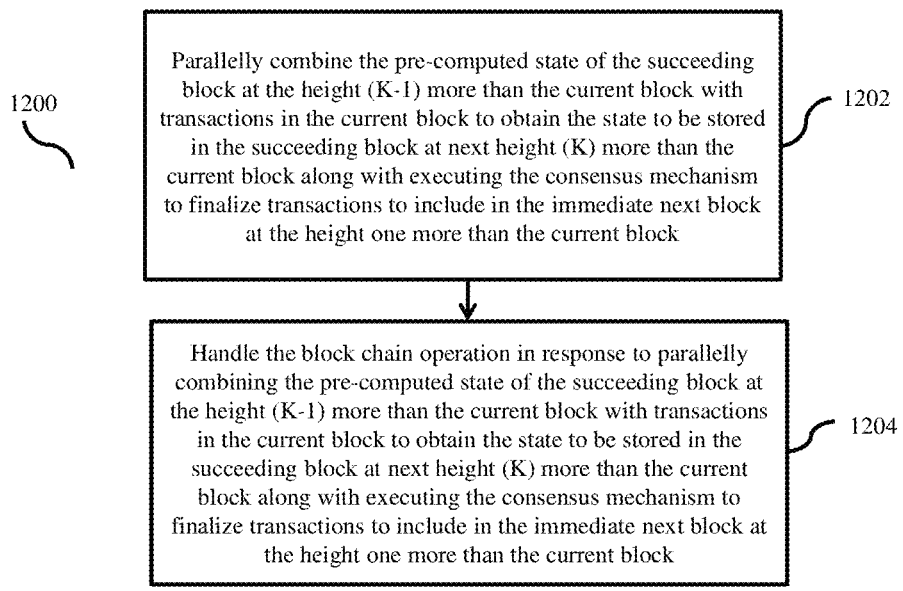
FIG. 12 is a flow chart illustrating a method for scaling computation in blockchain by delaying transaction execution, according to embodiments as disclosed herein.

FIG. 12 is a flow chart (1200) illustrating a method for scaling computation in the blockchain by delaying transaction execution, according to embodiments as disclosed herein. The operations (1202 and 1204) are handled by the block chain engine (140). At 1202, the method includes parallelly combining the pre-computed state of the succeeding block at a height (K−1) more than the current block with the transactions in the current block to obtain the state to be stored in the succeeding block at next height (K) more than the current block along with executing a consensus mechanism to finalize transactions to include in the immediate next block at the height one more than the current block. The k is a positive integer which can be set by the system designer of the chain system (100).

At 1204, the method includes handling the block chain operation in response to parallelly combining the pre-computed state of the succeeding block at a height more than the current block with transactions in the current block to obtain the state to be stored in the succeeding block at next height more than the current block along with executing a consensus mechanism to finalize transactions to include in the immediate next block at the height one more than the current block.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for handling block chain operation in a block chain system, comprising:
   parallelly combining, by the block chain system, a pre-computed state of a succeeding block at a height more than a current block with transactions in the current block to obtain a state to be stored in the succeeding block at next height more than a block associated with the pre-computed state along with executing a consensus mechanism to finalize the transactions to include in an immediate next block at a height one more than the current block is parallelized by computing a state required for validation of at least one succeeding block in parallel to mining of the current block; and
   handling, by the block chain system, the block chain operation in response to parallelly combining the pre-computed state of the succeeding block at a height more than the current block with transactions in the current block to obtain the state to be stored in the succeeding block at next height more than the block associated with the pre-computed state along with executing a consensus mechanism to finalize transactions to include in the immediate next block at the height one more than the current block.

2. The method as claimed in claim 1, wherein parallelly combining, by the block chain system, the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block comprises:

acquiring the current block;
determining that the state of the current block is similar to a state of at least one locally pre-computed next block at the same height as the current block;
terminating a validation phase of the current block based on the determination; and
activating a block creation phase of the next succeeding block to create a new block after terminating the validation phase of the current block.

3. The method as claimed in claim 2, wherein activating, by the block chain system, the block creation phase of the next succeeding block to create the new block comprises:
committing a current state of the current block;
selecting an ordered set of transactions for the immediate next block and conducting a preliminary check for the ordered set of the transactions;
creating the new block based on the preliminary check and one pre-computed state, and parallelly obtaining the state of a succeeding block at height greater than the current block by executing the transaction order of the current block.

4. The method as claimed in claim 1, wherein parallelly combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block comprise:
obtaining a valid a proof-of-work (POW) nonce for a current block;
obtaining a next state of at least one succeeding block by executing a transaction order of the current block based on detected POW nonce for the current block;
conducting a preliminary check for the transaction order of the immediate next block based on the rules of the blockchain; and
creating the immediate new block based on the preliminary check, a pre-computed state of the new block and the selected transaction order.

5. The method as claimed in claim 1, wherein combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block is parallelized by utilizing post-validation time of the current block to compute a state required for validation of at least one next block.

6. The method as claimed in claim 1, wherein the block chain system performs a preliminary check and an execution check, wherein the preliminary check is performed while including a transaction in the current block where a node checks that the transaction is formed and is eligible to appear in the block chain system, wherein the preliminary check checks that the transaction is correctly signed by a creator and determine if the transaction has already included earlier in the block chain system, wherein the execution check checks whether a state update mentioned by a block creator is indeed a correct state.

7. The method as claimed in claim 1, wherein parallelly combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block comprises:
parallelly executing transaction contained in the current block to save on creation time of at least one next block;
computing a state required for validation of the least one next block during a post-validation time of the current block; and
parallelly combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block based on the computation.

8. The method as claimed in claim 1, wherein parallelly combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block is parallelized by using a token associated with payment transactions including fee transactions and refund transactions and a token associated with contract transactions on the immediate next block, wherein the token associated with the payment transactions and the token associated with the contract transactions are different.

9. The method as claimed in claim 1, wherein the height of the succeeding block refers to a number of blocks after a genesis block including the succeeding block in consideration.

10. A block chain system for handling block chain operation, comprising: a memory;
a processor coupled with the memory; and
a block chain engine, coupled with the processor, configured to:
parallelly combine a pre-computed state of the succeeding block at a height more than the current block with transactions in the current block to obtain the state to be stored in the succeeding block at next height more than a block associated with the pre-computed state along with executing a consensus mechanism to finalize transactions to include in the immediate next block at the height one more than the current block is parallelized by computing a state required for validation of at least one next block in parallel to mining of a current block; and
handle the block chain operation in response to parallelly combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block.

11. The block chain system as claimed in claim 10, wherein parallelly combine the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block comprises: acquire the current block; determine that the state of the current block is similar to a state of at least one locally pre-computed next block; terminate a validation phase of the current block based on the determination; and activating a block creation phase of the next succeeding block to create a new block after terminating the validation phase of the current block.

12. The block chain system as claimed in claim 11, wherein activate the block creation phase to create the next succeeding block to create the new block comprises:
   commit a current state of the current block;
   select an ordered set of transactions for the immediate next block and conduct a preliminary check for the ordered set of the transaction;
   create the new block based on the preliminary check and one pre-computed state of the next block and parallel obtain the state of the succeeding block at height greater than the current block by executing the transaction order of the current block.

13. The block chain system as claimed in claim 10, wherein parallelly combine the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block comprises:
   obtain a valid a proof-of-work (POW) nonce for the current block;
   obtain a next state of at least one succeeding block by executing a transaction order of the current block based on detected POW nonce for the current block;
   conduct a preliminary check for the transaction order of the immediate next block based on rules of blockchain; and
   create the immediate new block based on the preliminary check and a pre-computed state of the new block and the selected transaction order.

14. The block chain system as claimed in claim 10, wherein the combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block is parallelized by utilizing post-validation time of a current block to compute a state required for validation of at least one next block.

15. The block chain system as claimed in claim 10, wherein the block chain system performs a preliminary check and an execution check, wherein the preliminary check is performed while including a transaction in the current block where a node must check that the transaction is well-formed and is eligible to appear in the block chain system, wherein the preliminary check checks that the transaction is correctly signed by a creator and determine if the transaction has already been included earlier in the current block, wherein the execution check checks whether a state update mentioned by the block creator is indeed a correct state.

16. The block chain system as claimed in claim 10, wherein the combine the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block comprises:
   parallelly execute transaction contained in a current block to save on creation time of at least one next block;
   compute a state required for validation of the at least one next block during a post-validation time of the first block; and
   parallelly combine the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block based on the computation.

17. The block chain system as claimed in claim 10, wherein combining the pre-computed state of the succeeding block at a height more than the current block with transactions in the current block to obtain the state to be stored in the succeeding block at next height more than the block associated with the pre-computed state along with executing the consensus mechanism to finalize transactions to include in the immediate next block at the height one more than the current block is parallelized by using a token associated with payment transactions including fee transactions and refund transactions and a token associated with a contract transaction on the immediate next block, wherein the token associated with the payment transactions and the token associated with the contract transactions are different.

18. The block chain system as claimed in claim 10, wherein the height of the succeeding block refers to a number of blocks after a genesis block including the succeeding block in consideration.

* * * * *